United States Patent [19]
Grinstein et al.

[11] Patent Number: 5,889,092
[45] Date of Patent: Mar. 30, 1999

[54] METHOD OF MODIFYING THE RHEOLOGICAL PROPERTIES OF LATEX PAINT

[75] Inventors: Reuben Grinstein, Blue Bell; Michael S. Wiggins, Ambler, both of Pa.

[73] Assignee: Henkel Corporation, Gulph Mills, Pa.

[21] Appl. No.: 500,819

[22] Filed: Jul. 10, 1995

Related U.S. Application Data

[63] Continuation of Ser. No. 890,213, May 29, 1992, abandoned.

[51] Int. Cl.$^6$ ...................................................... C08L 5/00
[52] U.S. Cl. ................................ 524/27; 524/54; 524/55; 524/56; 524/57; 524/58; 524/366; 524/368; 524/369; 524/375; 524/378; 524/502; 524/505; 568/607; 568/609; 568/611
[58] Field of Search ................................ 524/505, 56, 378, 524/27, 54, 368, 369, 375, 366, 502, 55, 57, 58; 568/607, 609, 611

[56] References Cited

U.S. PATENT DOCUMENTS

| | | | |
|---|---|---|---|
| 3,330,795 | 7/1967 | Schluter | 524/378 |
| 3,438,924 | 4/1969 | Chalmers et al. | 524/378 X |
| 3,687,885 | 8/1972 | Abriss et al. | 524/375 |
| 3,770,684 | 11/1973 | Singer et al. | 524/306 |
| 3,892,585 | 7/1975 | Sagane | 106/187 |
| 3,968,063 | 7/1976 | Sung | 524/56 |
| 4,079,028 | 3/1978 | Emmons et al. | 260/29.6 |
| 4,102,845 | 7/1978 | Schroder et al. | 524/378 X |
| 4,111,881 | 9/1978 | Paul | 524/378 |
| 4,131,585 | 12/1978 | Feigin | 524/375 X |
| 4,155,892 | 5/1979 | Emmons et al. | 260/29.2 |
| 4,311,622 | 1/1982 | Buter | 106/252 X |
| 4,327,008 | 4/1982 | Schimmel et al. | 524/378 X |
| 4,331,573 | 5/1982 | Zabrocki et al. | 524/375 X |
| 4,357,270 | 11/1982 | Pippa et al. | 524/375 X |
| 4,373,083 | 2/1983 | Seiner et al. | 524/378 X |
| 4,420,340 | 12/1983 | Mohr et al. | 524/375 X |
| 4,426,485 | 1/1984 | Hoy et al. | 524/591 |
| 4,499,233 | 2/1985 | Tetenbaum et al. | 524/591 |
| 4,619,960 | 10/1986 | Dodge | 524/502 X |
| 4,657,999 | 4/1987 | Hoefer et al. | 526/200 |
| 4,792,582 | 12/1988 | Hoefer et al. | 524/378 |
| 4,814,096 | 3/1989 | Evani | 524/375 X |
| 5,002,985 | 3/1991 | Andersson et al. | 524/42 |
| 5,047,167 | 9/1991 | Steyn et al. | 252/160 |
| 5,066,703 | 11/1991 | Hart et al. | 524/56 X |
| 5,124,389 | 6/1992 | Mente | 524/378 |
| 5,157,069 | 10/1992 | Campbell | 524/502 X |
| 5,169,894 | 12/1992 | Holland et al. | 524/502 |
| 5,227,423 | 7/1993 | Ingle | 524/502 X |
| 5,324,765 | 6/1994 | Mondet et al. | 524/423 |
| 5,424,122 | 6/1995 | Crandall et al. | 524/375 X |

FOREIGN PATENT DOCUMENTS

| | | |
|---|---|---|
| 0 355 712 | 2/1990 | European Pat. Off. . |
| 2359923 | 6/1974 | Germany . |
| 2359929 | 6/1974 | Germany . |
| 2403755 | 8/1974 | Germany . |

OTHER PUBLICATIONS

Journal of Coatings Technology, vol. 64, No. 804, pp. 87–94 (1992).
Surface Coatings Austral a, 22(10), 6 (1985).

*Primary Examiner*—Judy M. Reddick
*Attorney, Agent, or Firm*—Wayne C. Jaeschke; John E. Drach; Henry E. Millson

[57] ABSTRACT

The rheological properties of latexes and latex paint formulations thickened with non-urethane thickeners according to the invention are modified by adding to the latex or latex paint formulation an amount of a nonionic surfactant having an HLB value of from 4 to about 20 sufficient to decrease the low shear viscosity of the thickened latex without a corresponding reduction in the high shear viscosity.

14 Claims, No Drawings

METHOD OF MODIFYING THE RHEOLOGICAL PROPERTIES OF LATEX PAINT

This application is a continuation of application Ser. No. 07/890,213 filed on 29 May 1992, now abandoned.

FIELD OF THE INVENTION

This invention relates to the modification of the rheological properties of polymer latexes. More specifically, the invention relates to a method of modifying the flow and leveling of latex paints thickened with non-urethane associative thickeners.

DESCRIPTION OF THE RELATED ART

Many aqueous systems require thickeners in order to be useful for various types of applications. Such aqueous-based systems as cosmetics, protective coatings for paper and metal, printing inks, and latex paints all require the incorporation of thickeners in order to have the proper rheological characteristics for their particular uses. Many substances useful as thickeners are known in the art. These include natural polymers such as casein and alginates, and synthetic materials such as cellulose derivatives, acrylic polymers, and polyurethane polymers. The most preferred thickeners for latexes, especially latex paints, are the associative thickeners which are water-soluble polymers which contain hydrophobic groups. While the mechanism of how associative thickeners thicken and otherwise modify the rheological properties of latexes is not known, there are a number of theories which are set forth in U.S. Pat. No. 4,426,485, the entire contents of which are incorporated herein by reference. Polyurethane-based thickeners are recognized in the art as the best among the associative thickeners. The use of polyurethane-based thickeners in various applications is discussed in the Journal of Coatings Technology, Volume 64, number 804, pages 87–94 (1992) and taught in U.S. Pat. Nos. 4,079,028, 4,155,892, 4,499,233, and 4,426,485. Surface Coatings Australia, 22(10), 6, (1985) teaches that anionic and nonionic surfactants reduce the low shear viscosity of a latex thickened with a polyurethane-based associative thickener while having a relatively small effect of the high shear viscosity. The foregoing reference contains no teaching that nonionic surfactants in general, and alkyl polyglycoside surfactants, in particular, reduce the low shear viscosity of a latex thickened with one or more of the non-urethane compounds disclosed herein while having little or no effect of the high shear viscosity.

It has recently been discovered that a class of non-urethane compounds performs as well as polyurethane-based thickeners in latex paint applications. These compounds are disclosed in copending patent application Ser. No. 07/787,905 filed on Nov. 07, 1991 now abandoned. It has been found that in some instances that the performance of non-urethane thickeners must be modified in order to meet specific requirements. For example, certain compounds taught in copending patent application Ser. No. 07/787,905 are very efficient in reducing the low shear viscosity as well as the high shear viscosity of a latex or a latex paint when it is desired to reduce only the high or low shear individually without affecting the other. It is, therefore, an object of the present invention to reduce the low shear viscosity of latexes thickened with certain non-urethane thickeners without affecting the high shear viscosity.

SUMMARY OF THE INVENTION

It has been discovered that the rheological properties of latexes and latex paint formulations thickened with non-urethane thickeners of the formula I

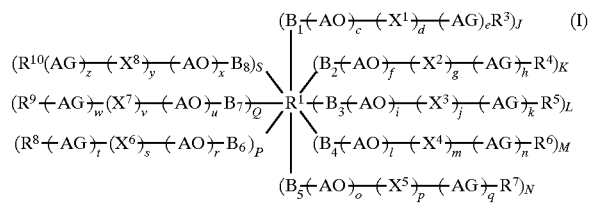

wherein $R^1$ is an aliphatic, substituted aliphatic, aromatic, or substituted aromatic radical having a valence of from 2 to 8; each of $B_1$–$B_8$ is independently an ester, amide, amine, ether, sulfide, disulfide, thiocarbamate, urea, thiourea, urethane, sulfate, phosphate, carbonyl, methylene, thioamide, carbonate, or imide linkage; each of $X^1$–$X^8$ is independently —$A_1$—$R^2$—$A_2$— or —$A_1$— wherein each of $A_1$ and $A_2$ is independently an ester, amide, amine, ether, sulfide, disulfide, urethane, thiocarbamate, urea, thiourea, sulfate, phosphate, carbonyl, methylene, thioamide, carbonate, or imide linkage and $R^2$ is a divalent aliphatic, substituted aliphatic, aromatic, or substituted aromatic radical with the proviso that only one of $B_1$–$B_8$ is urethane and that when one of $B_1$–$B_8$ is urethane, one of $A_1$ and $A_2$ is not urethane; each of d, g, j, m, p, s, v, y is independently 0 or 1, each of c, f, i, l, o, r, u, x is independently any integer or non-integer from 0 to about 200; each of J, K, L, M, N, P, Q, S is 0 or 1; each of e, h, k, n, q, t, w, z is independently any integer or non-integer from 0 to about 20; each of $R^3$–$R^{10}$ is independently an aliphatic, substituted aliphatic, aromatic, or substituted aromatic radical having from 1 to about 50 carbon atoms; each of AG and AO is independently an ethyleneoxy, 1,2-propyleneoxy, 1,2-butyleneoxy unit or combinations thereof can be modified by adding to the latex or latex paint formulation an amount of a nonionic surfactant having an HLB value of from 4 to about 20 sufficient to decrease the low shear viscosity of the thickened latex without a corresponding reduction in the high shear viscosity.

DESCRIPTION OF THE PREFERRED EMBODIMENTS

Other than in the operating examples, or where otherwise indicated, all numbers expressing quantities of ingredients or reaction conditions used herein are to be understood as modified in all instances by the term "about". The abbreviation ICI stands for the high shear viscosity measurement of the latex and is measured on the ICI (Research Equipment Limited) Cone and Plate Viscosimeter at a shear rate of 10,000 sec$^{-1}$ and is expressed in poise. The abbreviation KU, which refers to the low shear viscosity, stands for the Stormer viscosity measurement which is expressed in Krebs Units (KU) and is determined according to ASTM D662-81. The term flow and leveling refers to properties of latex paints which are measured according to ASTM D4062. A latex paint formulation is a composition which typically contains at least an aqueous emulsion or dispersion of a water insoluble polymer, a pigment, a pigment dispersant, and a preservative which is effective in controlling the growth of microorganisms. A latex is an emulsion or dispersion of one or more water insoluble polymers in water.

It has been found that when non-urethane thickeners of the formula I

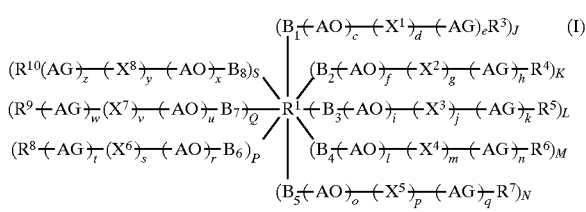

(I)

wherein $R^1$ is an aliphatic, substituted aliphatic, aromatic, or substituted aromatic radical having a valence of from 2 to 8; each of $B_1$–$B_8$ is independently an ester, amide, amine, ether, sulfide, disulfide, thiocarbamate, urea, thiourea, urethane, sulfate, phosphate, carbonyl, methylene, thioamide, carbonate, or imide linkage; each of $X^1$–$X^8$ is independently —$A_1$—$R^2$—$A_2$— or —$A_1$— wherein each of $A_1$ and $A_2$ is independently an ester, amide, amine, ether, sulfide, disulfide, urethane, thiocarbamate, urea, thiourea, sulfate, phosphate, carbonyl, methylene, thioamide, carbonate, or imide linkage and $R^2$ is a divalent aliphatic, substituted aliphatic, aromatic, or substituted aromatic radical with the proviso that only one of $B_1$–$B_8$ is urethane and that when one of $B_1$–$B_8$ is urethane, one of $A_1$ and $A_2$ is not urethane; each of d, g, j, m, p, s, v, y is independently 0 or 1, each of c, f, i, l, o, r, u, x is independently any integer or non-integer from 0 to about 200; each of J, K, L, M, N, P, Q, S is 0 or 1; each of e, h, k, n, q, t, w, z is independently any integer or non-integer from 0 to about 20; each of $R^3$–$R^{10}$ is independently an aliphatic, substituted aliphatic, aromatic, or substituted aromatic radical having from 1 to about 50 carbon atoms; each of AG and AO is independently an ethyleneoxy, 1,2-propyleneoxy, 1,2-butyleneoxy unit or combinations thereof are used to thicken latexes comprised of acrylic-based polymers, the rheological properties of the thickened latex are inappropriate for certain paint formulations. For example, when an all acrylic latex paint is thickened with a thickener of formula I the KU/ICI ratio is 150/2. For certain paint formulations, the desired KU/ICI ratio should be 100–90/2. Normally, an additive that would be added to reduce the KU viscosity to the 100–90 range would also reduce the ICI viscosity below 2.0. The resulting paint formulation would not meet the KU, ICI and flow and leveling target values for latex paints. In addition, some latexes thickened with thickeners of the formula I separate upon prolonged standing or storage. This separation phenomenon is generally known in the art as syneresis.

The nonionic surfactants according to the invention are those which have an HLB values of from about 4 to about 20. The HLB value is well known to those skilled in the art as a measure of the hydrophile-lipophile balance of a surface active substance. The greater the HLB value, the greater the relative water solubility of a particular surface active substance. Preferred nonionic surfactants are ethoxylated nonyl phenols having a degree of ethoxylation of from about 7 to about 20, and alkyl polyglycosides, also known as APG™ or Plantaren™ surfactants, which are trademark products of Henkel Corporation. The alkyl polyglycosides have the formula II $$R_4O(R_5O)_a(Z)_b \qquad \text{II}$$

wherein $R_4$ is a monovalent organic radical having from about 6 to about 30 carbon atoms; $R_5$ is divalent radical having from 2 to 4 carbon atoms; Z is saccharide residue having 5 or 6 carbon atoms; a is a number having a value from 0 to about 12; b is a number having a value from 1 to about 6. APG™ and/or Plantaren™ surfactants are commercially available materials and may be obtained from Henkel Corporation, Ambler, Pa., 19002. Examples of APG™ and/ or Plantaren™ surfactants include but are not limited to:

1. Glucoponm™ 225—an alkylpolyglycoside in which the alkyl group contains 8 to 10 carbon atoms.
2. APGM™ 325—an alkyl polyglycoside in which the alkyl group contains 9 to 11 carbon atoms.
3. Glucoponm™ —625—an alkyl polyglycoside in which the alkyl groups contains 12 to 16 carbon atoms.
4. APGTh™ 300—an alkyl polyglycoside substantially the same as the 325 product above but having a different average degree of polymerization.
5. Glucoponm™ 600—an alkylpolyglycoside substantially the same as the 625 product above but having a different average degree of polymerization.
6. Plantaren™ 2000—a $C_{8-16}$ alkyl polyglycoside.
7. Plantaren™ 1300—a $C_{12-16}$ alkyl polyglycoside.
8. Plantaren ™ 1200—a $C_{12-16}$ alkyl polyglycoside.

Other examples include alkyl polyglycoside surfactant compositions which are comprised of mixtures of compounds of formula II wherein Z represents a moiety derived from a reducing saccharide containing 5 or 6 carbon atoms; a is zero; b is a number from 1.8 to 3; and $R^4$ is an alkyl radical having from 8 to 20 carbon atoms. The composition is characterized in that it has increased surfactant properties and an HLB in the range of about 10 to about 16 and a non-Flory distribution of glycosides, which is comprised of a mixture of an alkyl monoglycoside and a mixture of alkyl polyglycosides having varying degrees of polymerization of 2 and higher in progressively decreasing amounts, in which the amount by weight of polyglycoside having a degree of polymerization of 2, or mixtures thereof with the polyglycoside having a degree of polymerization of 3, predominate in relation to the amount of monoglycoside, said composition having an average degree of polymerization of about 1.8 to about 3. Such compositions can be prepared by separation of the monoglycoside from the original reaction mixture of alkyl monoglycoside and alkyl polyglycosides after removal of the alcohol. This separation may be carried out by molecular distillation and normally results in the removal of about 70–95% by weight of the alkyl monoglycosides. After removal of the alkyl monoglycosides, the relative distribution of the various components, mono- and poly-glycosides, in the resulting product changes and the concentration in the product of the polyglycosides relative to the monoglycoside increases as well as the concentration of individual polyglycosides to the total, i.e. DP2 and DP3 fractions in relation to the sum of all DP fractions. Such compositions are disclosed in copending application Ser. No. 07/810,588, filed on Dec. 19, 1991, the entire contents of which are incorporated herein by reference.

The amount of nonionic surfactant necessary to decrease the low shear viscosity of the thickened latex without a corresponding reduction in the high shear viscosity can be easily determined by the skilled artisan and will depend upon a number of factors such as the nature of the non-urethane thickener, the type of latex, the nature of the nonionic surfactant, and whether or not the added nonionic surfactant causes syneresis or separating of the latex. The latexes which can be thickened with the thickeners according to the invention are those disclosed in U.S. Pat. No. 4,079,028 at column 12 line 64 to column 14, line 7 inclusive, the entire contents of which are incorporated herein by reference. For most commercial applications, a latex is thickened by adding a sufficient amount of a thickener according to the invention to a latex to bring the ICI viscosity into the 0.8 to 3.0 poise range and the Stormer viscosity into the 95 to 105 KU range. Typically this amount will be in the range of from about 0.1% to about 10% of the thickener according to the invention by weight of latex polymer solids and preferably between 1% and 3% by weight of latex polymer solids.

One group of preferred thickeners are compounds of the formula I wherein $R^1$ is meta-xyly; L,M,N,P,Q,S are each zero; J and K are each equal to one; each of $B_1$ and $B_2$ is an ether linkage; $R^3$ and $R^4$ are each nonylphenoxy, (AG) and (AO) are each ethyleneoxy, c and f range from about 50 to about 150, d, e, g, and h are each zero. Another group of preferred thickeners are compounds of the formula I wherein $R^1$ is 1,2,3-propanetriyl; M,N,P,Q,S are each zero; J, K and L are each equal to one; each of $B_1$, $B_2$ and $B_3$ is an ether linkage; $R^3$ and $R^4$ are each nonylphenoxy, $R^5$ is benzyl, substituted benzyl, or $C_{5-10}$ alkyl; (AG) and (AO) are each ethyleneoxy, c and f range from about 50 to about 150, d, e, g, h, i, j, and k are each zero. Still another group of preferred thickeners are compounds of the formula I wherein $R^1$ is benzal; L,M,N,P,Q,S are each zero; J and K are each equal to one; each of $B_1$ and $B_2$ is an ether linkage; $R^3$ and $R^4$ are each nonylphenoxy, (AG) and (AO) are each ethyleneoxy, c and f range from about 50 to about 150, d, e, g, and h are each zero.

A particularly preferred thickener is one which is a composition which is comprised of a mixture of three compounds of formula I wherein for each compound $R^1$ is metaxyly; L,M,N,P,Q,S are each zero; J and K are each equal to one; each of $B_1$ and $B_2$ is an ether linkage; $R^3$ and $R^4$ are each nonylphenoxy, (AG) is ethyleneoxy, d, e, g and h are each, zero, and: (a) c and f are each equal to about 125; (b) c and f are each equal to about 100; (c) one of c and f is equal to about 125 and the other of c and f is equal to about 100. Another particularly preferred thickener is one which is a composition which is comprised of a mixture of compounds of the formula I wherein $R^1$ is 1,2,3-propanetriyl; M,N,P,Q,S are each zero; J, K and L are each equal to one; each of $B_1$, $B_2$ and $B_3$ is an ether linkage; $R^3$ and $R^4$ are each nonylphenoxy, $R^5$ is benzyl; (AG) and (AO) are each ethyleneoxy, and: (a) c and f are each equal to about 125; (b) c and f are each equal to about 100; (c) one of c and f is equal to about 125 and the other of c and f is equal to about 100. Still another particularly preferred thickener is one which is a composition which is comprised of a mixture of compounds of the formula I wherein $R^1$ is benzal; L,M,N,P,Q,S are each zero; J and K are each equal to one; each of $B_1$ and $B_2$ is an ether linkage; $R^3$ and $R^4$ are each nonylphenoxy, (AG) and (AO) are each ethyleneoxy, and: (a) c and f are each equal to about 125; (b) c and f are each equal to about 100; (c) one of c and f is equal to about 125 and the other of c and f is equal to about 100. All of the thickeners of the formula I can be prepared as described in copending patent application Ser. No. 07/787,905 filed on Nov. 7, 1991, the entire contents of which are incorporated herein by reference.

The following examples are meant to illustrate but not limit the invention.

EXAMPLE 1

Tables 1, 2, and 3 show the effect of added surfactant on the high shear (ICI) and low shear (KU) viscosities of a styrene-acrylic latex thickened with thickeners I, II, and III. Thickener I is a mixture of three compounds of formula I wherein for each compound of the formula I $R^1$ is 1,2,3-propanetriyl; M,N,P,Q,S are each zero; J, K and L are each equal to one; each of $B_1$, $B_2$ and $B_3$ is an ether linkage; $R^3$ and $R^4$ are each nonylphenoxy, $R^5$ is benzyl; (AG) and (AO) are each ethyleneoxy, and: (a) c and f are each equal to about 125; (b) c and f are each equal to about 100; (c) one of c and f is equal to about 125 and the other of c and f is equal to about 100. Thickener II is a mixture of three compounds of formula I wherein for each compound $R^1$ is meta-xyly; L,M,N,P,Q,S are each zero; J and K are each equal to one; each of $B_1$ and $B_2$ is an ether linkage; $R^3$ and $R^4$ are each nonylphenoxy, (AG) is ethyleneoxy, d, e, g and h are each zero, and: (a) c and f are each equal to about 125; (b) c and f are each equal to about 100; (c) one of c and f is equal to about 125 and the other of c and f is equal to about 100. Thickener III is a mixture of three compounds of formula I wherein for each compound of the formula I $R^1$ is benzal; L,M,N,P,Q,S are each zero; J and K are each equal to one; each of $B_1$ and $B_2$ is an ether linkage; $R^3$ and $R^4$ are each nonylphenoxy, (AG) and (AO) are each ethyleneoxy, and: (a) c and f are each equal to about 125; (b) c and f are each equal to about 100; (c) one of c and f is equal to about 125 and the other of c and f is equal to about 100. The data also shows the greater the HLB, the greater the effect on low shear viscosity of a thickened latex.

TABLE 1

Effect of Added Surfactant on the High Shear (ICI) and Low Shear (KU) Viscosities of a Styrene-Acrylic Latex Thickened Thickener I

| Surfactant[2] | Amount[3] | ICI | KU |
|---|---|---|---|
| Blank | 0 | 1.5 | >143 |
| A | 1% | 1.6 | 138 |
| A | 2% | 1.5 | 128 |
| B | 0.75% | 1.5 | 111 |
| B | 1.5% | 1.4 | 116 |
| B | 2.25% | 1.4 | 100 |
| C | 0.5% | 1.6 | 118 |
| C | 0.75% | 1.5 | 96 |
| D | 0.75% | 1.7 | 118 |
| D | 1.0% | 1.4 | 87 |

[1]Thickener was used at 3 parts per hundred parts of latex. Latex solids = 30%.
[2]Surfactant A is NP(EO)$_4$OH; HLB = 8.9
Surfactant B is APG ™ 625; HLB = 12.1
Surfactant C is Glucopon ™ 425; HLB = 12.9
Surfactant D is NP(EO)$_{20}$OH; HLB = 16
[3]Amount is wt % surfactant based on total weight of latex.

TABLE 2

Effect of Added Surfactant on the High Shear (ICI) and Low Shear (KU) Viscosities of a Styrene-Acrylic Latex Thickened Thickener II

| Surfactant[2] | Amount[3] | ICI | KU |
|---|---|---|---|
| Blank | 0 | 1.5 | >143 |
| A | 1% | 1.5 | 118 |
| A | 2% | 1.6 | 108 |
| B | 0.50% | 1.5 | 115 |
| B | 0.75% | 1.5 | 99 |
| C | 0.50% | 1.6 | 113 |
| C | 0.75% | 1.4 | 95 |
| D | 0.50% | 1.4 | 94 |

[1]Thickener II was used at 3 parts per hundred parts of latex. Latex solids = 30%.
[2]Surfactant A is NP(EO)$_4$OH; HLB = 8.9
Surfactant B is APG ™ 625; HLB = 12.1
Surfactant C is Glucopon ™ 425; HLB = 12.9
Surfactant D is NP(EO)$_{20}$OH; HLB = 16
[3]Amount is wt % surfactant based on total weight of latex.

TABLE 3

Effect of Added Surfactant on the High Shear (ICI) and Low Shear (KU) Viscosities of a Styrene-Acrylic Latex Thickened Thickener III

| Surfactant[2] | Amount[3] | ICI | KU |
|---|---|---|---|
| Blank | 0 | 1.3 | 138 |
| A | 1.25% | 1.3 | 92 |
| B | 0.50% | 1.2 | 108 |
| C | 0.70% | 1.3 | 89 |
| D | 0.50% | 1.2 | 89 |

[1]Thickener III was used at 3 parts per hundred parts of latex.
Latex solids = 30%.
[2]Surfactant A is NP(EO)$_4$OH; HLB = 8.9
Surfactant B is APG ™ 625; HLB = 12.1
Surfactant C is Glucopon ™ 425; HLB = 12.9
Surfactant D is NP(EO)$_{20}$OH; HLB = 16
[3]Amount is wt % surfactant based on total weight of latex.

EXAMPLE 2

Tables 4 and 5 show the effect of different types of added surfactant on the high shear (ICI) and low shear (KU) viscosities of a styrene-acrylic latex paint formulation thickened with different thickeners according to the invention.

TABLE 4

Effect of Added Surfactant on the High Shear (ICI) and Low Shear (KU) Viscosities of a Styrene-Acrylic Latex Paint Formulation Thickened With Thickener I

| Surfactant | Amount[3] | ICI | KU |
|---|---|---|---|
| None[2] | 0 | 1.9 | >143 |
| NP(EO)$_4$OH | 3.5% | 2.4 | 142 |
| Plantaren ™ 2000 | 1.0% | 2.4 | 113 |
| Plantaren ™ 2000 | 1.25% | 2.1 | 107 |
| NP(EO)$_{20}$OH | 0.75% | 1.9 | 96 |

[1]Thickener I was at 2 parts per hundred parts of latex paint formulation.
[2]With no added surfactant, thickened latex separated upon standing.
[3]Amount is wt % surfactant based on total weight of latex paint.

TABLE 5

Effect of Added Surfactant on the High Shear (ICI) and Low Shear (KU) Viscosities of a Styrene-Acrylic Latex Paint Formulation Thickened With Thickener II

| Surfactant | Amount[3] | ICI | KU |
|---|---|---|---|
| None[2] | 0 | 2.1 | >143 |
| NP(EO)$_4$OH | 5.0% | 2.1 | 134 |
| Plantaren ™ 2000 | 0.05% | 2.0 | 115 |
| Plantaren ™ 2000 | 1.00% | 2.0 | 100 |
| NP(EO)$_{20}$OH | 0.50% | 2.0 | 96 |

[1]Thickener II was used at 2 parts per hundred parts of latex paint formulation.
[2]With no added surfactant, thickened latex separated upon standing.
[3]Amount is wt % surfactant based on total weight of latex paint.

EXAMPLE 3

Table 6 is a summary of the amount of an APG™ surfactant required to produce a stable, all-acrylic latex thickened with thickener I and the ICI and KU viscosity of the thickened latex.

TABLE 6

Amount of APG ™ Surfactant Required to Produce a Stable, All-Acrylic Latex Thickened With Thickener I and the ICI and KU Viscosity of the Thickened Latex

| Surfactant | Amount[3] | ICI | KU |
|---|---|---|---|
| None[2] | 0 | 1.6 | 108 |
| Glucopon ™ 225 | 0.50% | 0.8 | 86 |
| APG ™ 325 | 0.75% | 1.0 | 87 |
| Plantaren ™ 2000 | 0.75% | 1.0 | 85 |
| Glucopon ™ 625 | 0.50% | 1.0 | 87 |

[1]Thickener I was used at 2.5 parts per hundred parts of latex.
Latex solids = 30%.
[2]With no added surfactant, thickened latex separated upon standing.
[3]Amount is wt % surfactant based on total weight of latex.

Comparative Example

Table 7 illustrates the relative effect of added nonionic surfactant on the high and low shear viscosities of two commercial urethane-based thickeners, DSX-1514™ and QR-7087™, and thickeners I and II according to the invention. Table 7 shows that a latex thickened with a thickener according to the invention is more sensitive to added surfactant than a latex thickened with either of two commercial thickeners. The sensitivity of a particular thickener is defined as the percent decrease in KU divided by the percent of nonionic surfactant added multiplied by 100. The magnitude of the sensitivity factor is the measure of the degree to which a particular surfactant decreases the low shear viscosity.

TABLE 7

Relative Effect of Added Nonionic Surfactant On The High and Low Shear Viscosities of Two Urethane-Based Thickeners and Thickeners I and II

| Thickener[1] | Surfactant[2] | Amount[3] | ICI | KU | Factor[4] |
|---|---|---|---|---|---|
| I | none | 0 | 1.5 | >143 | — |
| II | none | 0 | 1.5 | >143 | — |
| DSX-1514 | none | 0 | 2.4 | 138 | — |
| QR-708 | none | 0 | 1.7 | 143 | — |
| I | A | 2% | 1.5 | 128 | 5 |
| II | A | 2% | 1.6 | 108 | 24 |
| DSX-1514 | A | 2.5% | 2.8 | 138 | 0 |
| QR-708 | A | 2.5% | 1.7 | >143 | 0 |
| I | C | 0.75% | 1.5 | 96 | 44 |
| II | C | 0.75% | 1.4 | 95 | 45 |
| DSX-1514 | C | 1.2% | 2.4 | 123 | 9 |
| QR-708 | C | 0.75% | 1.7 | 116 | 11 |
| I | D | 0.75% | 1.7 | 118 | 23 |
| II | D | 0.50% | 1.4 | 94 | 68 |
| DSX-1514 | D | 0.75% | 2.4 | 115 | 22 |
| QR-708 | D | 0.75% | 1.4 | 99 | 41 |

[1]-The composition of thickeners I and II is given in Example 1 DSX-1514 ™ is a product of Henkel Corp.
QR-708 ™ is a product of Rohm & Haas Co.
All thickeners were used at 3 parts per hundred parts of latex.
[2]-Surfactant A is NP(EO)$_4$OH; HLB = 8.9
Surfactant C is Glucopon ™ 425; HLB = 12.9
Surfactant D is NP(EO)$_{20}$OH; HLB = 16
[3]-Amount is wt % surfactant based on total weight of latex.
[4]-Percent decrease in KU divided by the percent of nonionic surfactant added multiplied by 100.

EXAMPLE 4

Table 8 contains a summary of the properties of fully formulated styrene-acrylic latex paint thickened with thickeners I and II according to the invention, two commercial thickeners, and thickener I containing 1.67 lbs of Gluco-ponm™ 225 per 100 gallons of paint and 5.2 lbs of thickener I per 100 gallons of paint. The data show that the flow and leveling increased from the minimum possible value of 1 to the maximum value of 8 through the incorporation of the Glucoponwm™ 225 surfactant.

TABLE 8

Selected Properties of Fully Formulated Styrene-Acrylic Latex Paint

| Thickener[1] | Amount[2] | ICI | KU | F & L[3] | Sag[4] |
|---|---|---|---|---|---|
| None | 0 | | | 8 | 4 |
| I | 4.3 | 1.9 | >143 | 1 | 24 |
| II | 5.5 | 1.8 | 127 | 1 | 24 |
| DSX-1514 | 1.3 | 0.7 | 103 | 8 | 8 |
| QR-708 | 1.2 | 0.7 | 103 | 8 | 6 |
| I/Glucopon ™ 225 | 1.67/5.2 | 1.5 | 112 | 8 | 10 |

[1]-The composition of thickeners I and II is given in Example 1
[2]-Pounds of thickener/100 gallons of paint formulation.
[3]-Flow and leveling-ASTM D4062.
[4]-Sag-ASTM D4400.

What is claimed is:

1. An aqueous composition comprised of: (1) a latex and, (2) a thickening-effective amount of a compound of the formula I

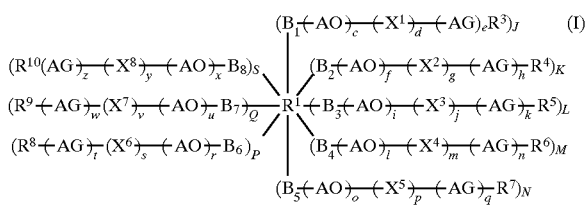

wherein $R^1$ is an aliphatic or aromatic group having a valence of from 2 to 8; each of $B_1$–$B_8$ is an ether linkage; each of $X^1$–$X^8$ is $R^2O$—, wherein each $R^2$ group is independently a divalent aliphatic, or divalent aromatic group; each of d, g, j, m, p, s, v, y is independently 0 or 1, each of c, f, i, I, o, r, u, x is independently any number from 0 to about 200; each of J, K, L, M, N, P, O, Q, S is 0 or 1 and the sum of J, K, L, M, N, P, Q and S is equal to the valence of $R^1$; each of o, h, k, n, q, t, w, z is independently any number from 0 to about 20; each of $R^3$–$R^{10}$ is independently an aliphatic or aromatic group having from 1 to about 50 carbon atoms; each of AG and AO is ethyleneoxy; (3) an amount of a nonionic surfactant having an HLB value of from about 4 to about 20 sufficient to decrease the low shear viscosity without a corresponding reduction in the high shear viscosity of said aqueous composition.

2. The composition of claim 1 wherein said nonionic surfactant is a compound of the formula II $$R_4O(R_5O)_a(Z)_b \quad (II)$$

wherein $R_4$ is a monovalent organic radical having from about 6 to about 30 carbon atoms; $R_5$ is divalent radical having from 2 to 4 carbon atoms; Z is saccharide residue having 5 or 6 carbon atoms; a is a number having a value from 0 to about 12; b is a number having a value from 1 to about 6.

3. The composition of claim 2 wherein $R_4$ is alkyl containing 8 to 10 carbon atoms.

4. The composition of claim 2 wherein $R_4$ is alkyl containing 9 to 11 carbon atoms.

5. The composition of claim 2 wherein said nonionic surfactant is a an alkyl polyglycoside having an HLB of 12.1.

6. The composition of claim 2 wherein $R_4$ is alkyl containing 8 to 16 carbon atoms.

7. The composition of claim 2 wherein said nonionic surfactant is a $C_{12-16}$ alkyl polyglycoside.

8. The composition of claim 1 wherein said nonionic surfactant is a mixture of compounds of the formula II $$R_4O(R_5O)_a(Z)_b \quad (II)$$

wherein $R_4$ is an alkyl radical having from 8 to 20 carbon atoms; Z represents a moiety derived from a reducing saccharide containing 5 or 6 carbon atoms; a is zero; b is a number from 1.8 to 3, wherein said composition has an HLB in the range of about 10 to about 16 and a non-Flory distribution of glycosides comprised of a mixture of an alkyl monoglycoside and a mixture of alkyl polyglycosides having varying degrees of polymerization of 2 and higher in progressively decreasing amounts, in which the amount by weight of polyglycoside having a degree of polymerization of 2, or mixtures thereof with the polyglycoside having a degree of polymerization of 3, predominate in relation to the amount of monoglycoside, said composition having an average degree of polymerization of about 1.8 to about 3.

9. The composition of claim 1 wherein said thickener is a compound of formula I wherein $R^1$ is meta-xyly; L,M,N,P,Q,S are each zero; J and K are each equal to one; $R^3$ and $R^4$ are each nonylphenoxy, c and f range from about 50 to about 150, d, e, h and g are each zero.

10. The composition of claim 1, wherein said thickener is a mixture of three compounds of formula I wherein for each compound $R^1$ is meta-xyly; L,M,N,P,Q,S are each zero; J and K are each equal to one; $R^3$ and $R^4$ are each nonylphenoxy, d, e, h, and g are each zero and: (a) c and f are each equal to about 125; (b) c and f are each equal to about 100; (c) one of c and f is equal to about 125 and the other of c and f is equal to about 100.

11. The composition of claim 1, wherein said thickener is a compound of formula I wherein $R^1$ is 1,2,3-propanetriyl; M,N,P,Q,S are each zero; J. K and L are each equal to one; $R^3$ and $R^4$ are each nonylphenoxy, $R^5$ is benzyl, substituted benzyl, or $C_{1-10}$ alkyl; c and f range from about 50 to about 150, e, d, h, g, i, J, and k are each zero.

12. The composition of claim 11 wherein said thickener Is a mixture of three compounds of formula I wherein for each compound of the formula I $R^1$ is 1,2,3-propanetriyl; M,N, P,Q,S are each zero; J, K and L are each equal to one; $R^3$ and $R^4$ are each nonylphenoxy, $R^5$ is benzyl; and: (a) c and f are each equal to about 125; (b) c and f are each equal to about 100; (c) one of c and f is equal to about 125 and the other of c and f is equal to about 100.

13. The composition of claim 1 wherein said thickener is a compound of formula I wherein $R^1$ is benzal; L,M,N,P,Q,S are each zero; J and K are each equal to one; $R^3$ and $R^4$ are each nonylphenoxy, c and f range from about 50 to about 150, e, d, h and g are each zero.

14. The composition of claim 13 wherein said thickener is a mixture of three compounds of formula I wherein for each compound of the formula I $R^1$ is benzal; L,M,N,P,Q,S are each zero; J and K are each equal to one; $R^3$ and $R^4$ are each nonylphenoxy, and: (a) c and f are each equal to about 125; (b) c and f are each equal to about 100; (c) one of c and f is equal to about 125 and the other of e and h is equal to about 100.

* * * * *